United States Patent [19]

Todd, Jr. et al.

[11] Patent Number: 4,918,240
[45] Date of Patent: Apr. 17, 1990

[54] PURIFICATION OF BETA ACIDS FOR HYDROGENOLYSIS AND SUCH PURIFIED BETA ACIDS

[75] Inventors: Paul H. Todd, Jr.; James A. Guzinski, both of Kalamazoo, Mich.

[73] Assignee: Kalamazoo Holdings, Inc., Kalamazoo, Mich.

[21] Appl. No.: 232,289

[22] Filed: Aug. 15, 1988

[51] Int. Cl.$^4$ .............................................. C07C 45/78
[52] U.S. Cl. ...................................... 568/366; 568/350; 568/347; 568/341; 568/377; 426/600
[58] Field of Search ............... 568/350, 341, 366, 377, 568/367; 426/600

[56] References Cited

U.S. PATENT DOCUMENTS

| | | | |
|---|---|---|---|
| 3,552,975 | 1/1971 | Warden et al. | 568/341 |
| 3,892,808 | 7/1975 | Mitchell | 568/366 |
| 4,154,864 | 5/1979 | Grant | 568/377 |
| 4,160,287 | 7/1979 | Moll et al. | 568/377 |
| 4,324,810 | 4/1982 | Goldstein et al. | 568/377 |
| 4,590,296 | 5/1986 | Cowles et al. | 568/341 |
| 4,778,691 | 10/1988 | Todd et al. | 568/377 |

*Primary Examiner*—James H. Reamer
*Attorney, Agent, or Firm*—Gordon W. Hueschen

[57] ABSTRACT

Beta acids, separated from hop extracts, are purified prior to hydrogenolysis by mixing with an aqueous solution of polyvalent metal ions, preferably edible ions such as magnesium or calcium ions, separating the aqueous beta acids from insoluble materials containing catalyst poisons, and recovering the thus-purified beta acids which are catalyst-poison free and in a form suitable for hydrogenolysis to 4-desoxy alpha acids.

37 Claims, No Drawings

PURIFICATION OF BETA ACIDS FOR HYDROGENOLYSIS AND SUCH PURIFIED BETA ACIDS

BACKGROUND OF THE INVENTION AND PRIOR ART

1. Field of Invention

Hops, hop extracts, beta acids, improvements in the purification of hop extracts and components thereof for their more advantageous utilization in the production of flavorings for beer, ale, and the like.

2. Background of the Invention

It is now well known that beta acids may be hydrogenolysed for conversion to 4-desoxy alpha acids, which are then converted to tetrahydroalpha acids by oxidation, which tetrahydroalpha acids have complete light stability as well as properties of improving the foam, as well as the cling and mouth feel of beer. Such beta acids were originally crystallized, or involved complicated clean up procedure, and resulted in reduced yields of the beta acids as well as the desired 4-desoxy alpha acid hydrogenolysis product. The problem is to provide beta acids of sufficient stability and purity to permit their employment in the ensuing hydrogenolysis step and to do this with elimination of catalyst poisons but without the necessity of crystallization and recrystallization, without oxidative degradation of the beta acids at some point in the process, without requiring high temperatures for the ensuing hydrogenolysis step, without significant byproduct formation, without complicated clean up procedure, and without impairment of yields either of the desired purified beta acids or the 4-desoxy alpha acid hydrogenolysis product thereof in the ensuing hydrogenolysis step.

All of the foregoing advantages are provided by the novel purification procedure of the present invention and by the thus-purified beta acids obtained thereby.

The reaction sequence for the reactions described in the foregoing is as follows:

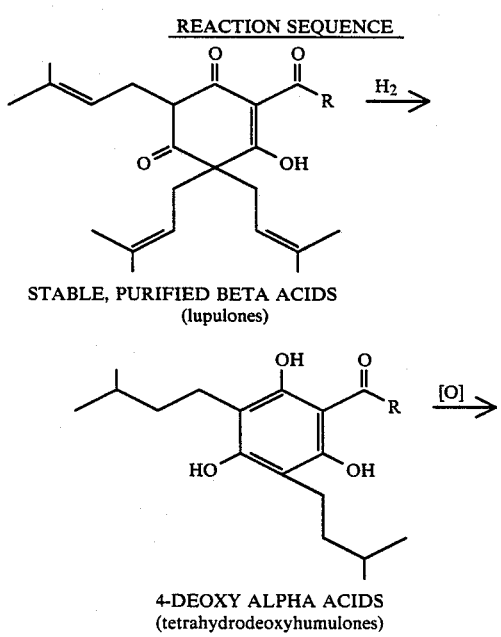

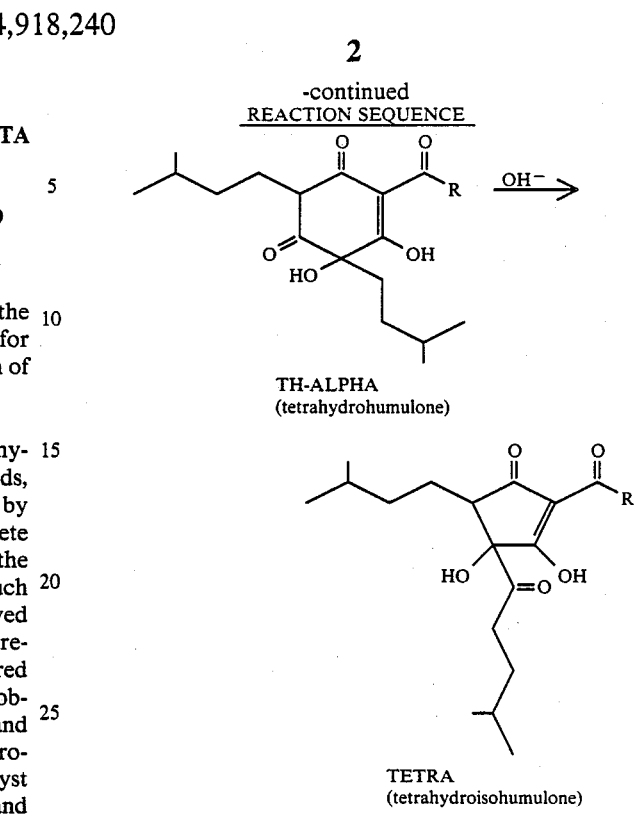

3. Prior Art

The prior art is replete with methods for converting hop alpha acids into forms suitable for pre- and post-fermentation addition, as a means of improving the utilization of hops and control over the bitter flavoring imparted by hops to beer (Todd U.S. Pat. No. 3,486,906; Mitchell U.S. Pat. No. 3,949,092.). The alpha acids present in hops are normally converted during boiling of the wort to the bitter iso-alpha acids with considerable loss of yield and formation of non-bitter by-products, which disadvantages are overcome by the improvements. The hop beta acids have generally been considered a useless constituent of the hops.

It is known that normal iso-alpha acids, which are unreduced, can contribute a skunk-like aroma to beer when exposed to light, and reduction of the iso-alpha acids with borohydride reduces this effect. Improvements of this type are reported by Westermann (U.S. Pat. No. 3,798,332). Although it was recognized that beta acids could be converted to 4-desoxy alpha acids by hydrogenolysis, and the 4-desoxy alpha acids converted to tetrahydro alpha acids by oxidation, no practical method was available until Worden (U.S. Pat. No. 3,923,897 combined with U.S. Pat. No. 3,552,975). More recently, Cowles (U.S. Pat. No. 4,644,084) has disclosed an alternative for oxidizing the 4-desoxy alpha acids (made from beta acids) to transform them into tetrahydro iso-alpha acids.

Because the tetrahydro and hexahydro iso-alpha acids disclosed by Worden and Cowles have complete light stability as well as properties of improving the foam as well as the cling and mouth feel of beer, beta acids have now become of value. Improvements in the technique for converting them into hop bittering substances are consequently important. The objects of these improvements must be to improve yield, reduce cost, improve purity of product, and simplify the procedure involved.

This invention achieves these goals through a unique purification process for the beta acids which removes catalyst poisons prior to hydrogenolysis.

Worden (U.S. Pat. No. 3,552,975) describes procedure for the hydrogenolysis of beta acids. Palladium, preferably on charcoal, or platinum are the catalysts employed in this hydrogenolysis reaction involving uptake of four (4) molecules of hydrogen. In Worden's preferred experiments, recrystallized beta acid is employed as starting material. Hydrogenolysis of this material provides a product of acceptable purity in good yield. In the laboratory, recrystallization of beta acids is not a cumbersome technique, and precautions can be taken to avoid degradation of the pure beta acids, which degrade rapidly even in air. In commercial operation, however, such procedure becomes exceptionally cumbersome and prohibitively expensive. The present invention provides beta acids of equal purity without crystallization and recrystallization, and which are resistant to oxidative degradation, all aspects and improvements which are new to the art.

The procedure of Cowles, in which beta acids are precipitated from alkaline solution using carbon dioxide, is acceptable if high temperatures are to be used for the subsequent hydrogenolysis. However, under the conditions of Cowles, by-product formation is significant, clean-up procedure is complicated, and yields of desired 4-desoxy alpha acid are impaired. The present invention obviates these problems by allowing low-temperature, low-pressure hydrogenolysis of the purified and stable beta acid product of the invention.

OBJECTS OF THE INVENTION

It is an object of the present invention to provide the foregoing advantages already enumerated in the foregoing under "Background of the Invention" and further to provide a method for the removal of palladium or platinum catalyst poisons from a beta acid solution comprising the step of agitating an aqueous alkaline solution of beta acids at an alkaline pH in the presence of polyvalent metal ions other than palladium and platinum, preferably edible polyvalent metal ions, and separating insoluble materials containing catalyst poisons from the beta acids. A further object of the invention is the provision of such a process wherein the polyvalent metal ions are calcium or magnesium ions, and a further object is the provision of such a process which may be conducted in the essential absence of organic solvent or in the presence of a food-grade organic solvent of natural or synthetic origin, which solvent may be a non-chlorinated solvent or a hydrocarbon solvent. Another object of the invention is the provision of such procedure which is repeated more than once with removal of insoluble material each time, and additional objects are the provision of such a procedure carried out at a pH above about 10, preferably above about 10.5 and optimally above about 11 and below about 12.9, and wherein the metal ions are provided in the form of magnesium chloride, calcium chloride, magnesium hydroxide, or calcium hydroxide. Still additional objects of the invention are the provision of such stabilized and purified beta acids and a process for hydrogenolysis thereof to 4-desoxy alpha acids. Still further objects will be obvious to one skilled in the art to which this invention pertains.

SUMMARY OF THE INVENTION

The invention, then, inter alia comprises the following aspects, alone or in combination:

A method for the removal of palladium or platinum catalyst poisons from a beta acid solution comprising the step of agitating an aqueous alkaline solution of beta acids at a pH of at least about 10 in the presence of polyvalent metal ions other than palladium and platinum and separating insoluble materials containing catalyst poisons from the aqueous beta acid solution; such a method wherein the polyvalent metal ions are selected from the group consisting of calcium and magnesium ions; such a method which is conducted in the essential absence of organic solvent; such a method in which the method is carried out in the presence of a food-grade organic solvent of natural or synthetic origin; such a method in which the solvent is a non-chlorinated solvent; such a method in which the solvent is a hydrocarbon solvent; such a method wherein the procedure may be repeated more than once with removal of insoluble material each time; such a method wherein the procedure is carried out at a pH above about 10.5; such a method wherein the procedure is carried out at a pH above about 11; such a method wherein the pH is below about 12.9; such a method wherein the metal ions are provided in the form of magnesium chloride $MgCl_2$; such a method wherein the metal ions are provided in the form of calcium chloride $CaCl_2$; such a method wherein the metal ions are provided in the form of magnesium hydroxide $Mg(OH)_2$; such a method wherein the metal ions are provided in the form of calcium hydroxide $Ca(OH)_2$; such a method in which the purified beta acids are recovered by precipitation from a solvent-free purified aqueous beta acid solution by reducing the pH using carbon dioxide or an edible mineral or organic acid; such a method in which the purified beta acids are recovered from the aqueous solution into an edible solvent by reducing the pH in the presence of an edible solvent; such a method in which the purified beta acids are recovered from the aqueous solution by salting out; such a method in which the metal ions are edible polyvalent metal ions; and such a method for the removal of palladium or platinum catalyst poisons from a beta acid solution comprising the step of agitating an aqueous alkaline solution of beta acids at a pH above about 10.5 in the presence of calcium or magnesium ions and in the essential absence of organic solvent, and separating insoluble materials containing catalyst poisons from the aqueous beta acid solution, wherein the procedure may be repeated more than once with removal of insoluble material each time, and then recovering the purified beta acids by reducing the pH using carbon dioxide or an edible mineral or organic acid; such a method comprising the step of agitating an aqueous alkaline solution of beta acids at a pH between about 11.2 and 11.9, preferably at a pH of about 11.5, in the presence of calcium or magnesium ions and in the presence of a natural oil comprising a terpene and a fatty alcohol, preferably a fatty alcohol having between about 10 and about 14 carbon atoms, and separating insoluble materials containing catalyst poisons from the aqueous beta acid solution, the procedure possibly being repeated more than once with removal of insoluble material each time, and then recovering the purified beta acids by reducing pH using an edible mineral or organic acid or carbon dioxide.

Additionally, such a method wherein the purified beta acids thus produced are subjected to the step of hydrogenolysis to produce 4-desoxy alpha acids, and preferably such a hydrogenolysis step using a palladium or platinum catalyst, preferably a palladium on charcoal catalyst.

Further, beta acids which are free of palladium and platinum catalyst poisons which have been removed by agitating an aqueous alkaline solution of beta acids with polyvalent metal ions other than palladium and platinum and separating insoluble materials containing catalyst poisons; and such beta acids wherein the polyvalent metal ions are selected from the group consisting of calcium and magnesium ions.

GENERAL DESCRIPTION OF THE INVENTION

The essence of the present invention is the discovery that catalyst poisons, which are present in hops and hop extracts, may be removed from beta acids by agitation in an aqueous alkaline medium in the presence of polyvalent metal ions, preferably edible polyvalent ions such as magnesium (preferable) or calcium (less preferable) ions, and even without the presence of a solvent. Catalyst poisons are defined as that class of substances which deactivate the catalyst, so that the addition of hydrogen in a hydrogenolysis procedure is slowed or stopped. Known catalyst poisons are lead and hydrogen sulfide, but these are not present in hops or hop extracts in sufficient amount to poison the catalyst, there being only traces of such materials present if any at all.

Although it was originally speculated that the catalyst poison might come from herbicides or pesticides used in commercial hop yards, or from sulfur used during kilning, a 1987 crop of hops from an experimental planting, harvesting, and air drying in Kalamazoo, Michigan, U.S.A., all free of herbicides and pesticides, also contained the catalyst poison. Therefore, it is a natural constituent of hops, and one which is readily soluble in solvents such as $CO_2$, hexane, and alcohol.

It should be mentioned that calcium and magnesium ions are used to catalytically convert alpha acids to iso-alpha acids, under alkaline conditions, as shown in Cowles and Todd (U.S. Pat. No. 4,002,683). They are then removed from the iso-alpha acids by acidification, also as shown by Cowles. An accepted practical alternative, using a hop extract, is to separate the alpha acids from the remainder of the extract with alkali, add magnesium or calcium ions to form the alpha acid complex, and filter the precipitated complex, which isomerizes upon heating. The dry powder complex can be added to wort as is, or acidified prior to addition. Needless to say, the catalyst poisons remain in the organic beta acid phase of the hop extract, which remains after removal of alpha acids, in all of these prior art procedures. Clearly, the catalyst poisons are preferentially soluble in the phase containing the beta acids rather than in the aqueous alpha acid phase.

With beta acids, polyvalent metal ions, such as magnesium and calcium ions, do not readily form complexes and, when added to alkaline solutions of beta acids, a solid beta acid complex is not formed as in the case of alpha acids. According to the invention, the function of the ions is instead to complex the catalyst poisons, making them insoluble in the alkaline medium. Upon acidification, the poisons are released, so that a minimum pH of about 10 is required for the invention to be operative, and for best results the pH is preferably above about 10.5, and optimally above about 11 but below about 12.9.

The catalyst poisons are not adsorbed by common adsorbents such as silica, activated carbon, or activated clays. The effect of polyvalent ions, the magnesium and calcium ions, is therefore not that of an adsorbent. The nature of the poisons is simply unknown, and the action of the ions is therefore not understood. It is certainly not the removal of traces of alpha acids remaining in the beta acids. Although other polyvalent metal ions, such as zinc, aluminum, or iron ions, serve the same function as magnesium and calcium ions, they are not preferred because any residuals thereof may affect the flavor of a beer ultimately flavored with the beta acid hydrogenolysis products.

Although a preferred procedure for removing the catalyst poisons is without solvent, the employment of water-immiscible food-grade solvents is also compatible with this invention. For example, hydrocarbons such as hexane, esters, liquid fatty alcohols, terpenes such as the limonene recovered from folding orange oil, and even permitted chlorohydrocarbons, may be used. However, the latter are in great disfavor, and the food and beverage industry is making every effort to eliminate them at all stages of processing, even if they are operative.

A most preferred procedure according to this invention is to utilize the beta acids and non-acidic resin fraction, for example as obtained by the procedure of Todd (U.S. Pat. No. 4,666,731), adjust the pH to about 10.5 using three to five volumes of water, add magnesium salt, e.g., chloride solution, and agitate at a temperature which will keep the organic phase liquid while slowly raising the pH to about 12 to 12.5, as with KOH, with constant agitation, removing the organic layer, and filtering the aqueous beta acid solution. If, for any reason, such as with a batch of extract which is highly contaminated with catalyst poisons, the once purified beta acids are not pure enough at this stage, the process may be repeated in the absence of an organic phase, treating only the aqueous beta acids, or in the presence of a terpene organic phase, using a terpene such as limonene or myrcene, the latter being a major constituent of natural hop oil.

In preparation for the ensuing hydrogenolysis step, the purified beta acids may be recovered from the alkaline aqueous phase by the $CO_2$ method of Cowles, or they may be precipitated with a stronger non-toxic mineral or organic acid, or they may be recovered into hexane or other food-grade solvent by acidification. The exact manner of recovery is not critical, and the particular procedure employed can be adapted to the particular facility available for processing. As the examples will show, various modifications of the preferred procedure are also satisfactory and successful in that they produce a purified and stable beta acid product which enables employment of much gentler hydrogenolysis conditions and effects greatly improved yields of desired 4-desoxy alpha acids as compared with the same hydrogenolysis reaction when purified or otherwise purified beta acids are employed.

DETAILED DESCRIPTION OF THE INVENTION

The following Examples are given to illustrate the invention, but are not to be construed as limiting.

EXAMPLE 1

Purification of beta acids with and without solvents

A $CO_2$ extract of hops, from which the alpha acids had been substantially removed, containing about 50% beta acids by UV, as well as non-acidic resins, hop oil, and water, was agitated with 7 volumes of water. The pH was adjusted to 9.7 and the water discarded, thereby removing traces of alpha acids and water-soluble salts, sugars, etc. Another 7 volumes of water were added and then 1% w/w (based upon beta acids) of $MgCl_2$ as a 20% solution in water was added slowly with agitation. The solution remained clear. At a temperature of 60°, the organic phase was liquid. A 10% KOH solution was added dropwise, with agitation, to a pH of 12.5 and agitated for 3 hours. The phases were allowed to separate and the lower phase was withdrawn and filtered. The same amount of $MgCl_2$ was again added to the aqueous phase, and the solution agitated overnight. The aqueous solution was filtered and divided. The beta acids were recovered into solvent from the first portion by adding 1 volume of hexane, dropping the pH to 9.8 with mineral acid, and discarding the aqueous phase. The beta acids were recovered from the second portion by dropping the pH to 9.8 using a stream of carbon dioxide and filtering.

Using the method of Worden (U.S. Pat. No. 3,552,975), Example 1, and an initial hydrogen pressure of 35 pounds, at a temperature of about 25° C., and with 5% (based on weight of the beta acids) of 2½% Pd on charcoal, but using sulfuric acid after Cowles U.S. Pat. No. 4,590,296, Example 5, both portions were hydrogenolyzed. The beta acids from the first portion took up all their hydrogen in 2 hours, and the beta acids recovered using carbon dioxide (non-solvent) took up all their hydrogen in 3 hours. (Worden used recrystallized beta acids, resulting in loss of beta.)

By contrast, beta acids made from the same initial starting solution of beta acids, following the discarding of the pH 9.7 water, agitating with KOH at a pH of 12 to 12.5, separating the aqueous beta acids, filtering, and precipitating the unpurified beta acids as above by the method of Cowles, did not take up hydrogen. Nor did unpurified beta acids recovered into hexane at a pH of 9.8. More catalyst and higher pressures and temperatures are suggested, with an increase in by-product formation and decrease in yield. However, when increasing catalyst to 15% w/w, uptake still did not occur at all, even after 16 hours, suggesting that this batch of hop extract contained enough catalyst poison to prevent hydrogen uptake with any economically-feasible amount of catalyst.

This example illustrates the following: (1) unpurified beta acids do not take up hydrogen under mild conditions; (2) following purification by the method of the invention, beta acids recovered into hexane take up hydrogen about as rapidly as those recovered as solid material after reducing the pH with $CO_2$; (3) beta acids from the hop extract, which have not been purified with Mg ion, do not take up hydrogen under mild conditions, even when greater amounts of catalyst and longer reaction periods are employed.

EXAMPLE 2

Use of hydrocarbon solvent

An alkaline solution of beta acids from a $CO_2$ hop extract, from which the alpha acids had been removed into alkaline water, was agitated with hexane to remove any residual hop waxes and oils. This solution was then used for the Experiments listed in Table I, which were carried out by adding 1% by weight of $MgCl_2$ (based upon weight of the beta acids) to the alkaline beta acid solution, the solution agitated the indicated time, the aqueous phase separated from the solvent phase and from any gums forming at the interphase, and the treatment repeated the indicated number of times. The beta acids were then recovered into hexane by acidification, desolventized, and hydrogenolyzed using Pd/C catalyst. The time to complete uptake of hydrogen is indicated. All procedures were conducted at about 20° C.

TABLE I

| POISON REMOVAL WITH HEXANE AND ORANGE TERPENES | | | | | | |
|---|---|---|---|---|---|---|
| % Beta in $H_2O$ | pH $H_2O$ | Wt/Wt % $MgCl_2$ To Beta | Number of Treatments | Approx. Time of Treatment | Solvent | Hydrogenolysis Time |
| 17 | 11.5 | 1% | 1 | 6 hours | 0 | 7 hours |
| 9 | 12–13 | 0 | 0 | 0 | 0 | would not hydrogenolyze |
| 9 | 12.4 | 1% | 3 | 6 hours | hexane | 2½ hours |
| 9 | 12.5 | 1% | 4 | 6 hours | orange terpene | 4½ hours |
| 9 | 12.2 | 1% | 2 | 6 hours | orange terpene | 7 hours |
| 15 | 12.7 | 1%* | 3 | 15 min. | hexane | 5 hours |

*added in water solution.

This example shows that both solid and dissolved $MgCl_2$ can be used, the latter being preferable, that additional catalyst poisons are removed by subsequent treatments (there appearing to be an equilibrium), and that concentration of beta acids in the aqueous phase is not critical. It also shows that the unpurified beta acids do not take up hydrogen under mild hydrogenolysis conditions which minimize by-product formation. Orange terpenes (limonene) are used as an example of non-petroleum derived natural solvents.

In this example, the solvent can also comprise heptane, hop essential oils, or like hydrocarbon solvent, and a lower alkanol can be present in the aqueous phase. The presence of a water-insoluble solvent assists in the separation, but this example also shows that it is not essential.

EXAMPLE 3

Separation of pure beta and catalyst poisons using $MgCl_2$ and hexane 21.5 g of $CO_2$ hop extract from which the alpha acids had been separated were agitated with 100 ml of water, and the mixture warmed to 60° C. and pH brought to 12.5 to dissolve the beta acids in the water. The aqueous layer was separated from the insoluble organic phase containing hop essential oils, lipids, etc., and extracted with 10 ml of hexane to remove residual lipids. The pH was raised to 13 and 4 ml of 10% $MgCl_2.6H_2O$ was added dropwise. The mixture was agitated for three hours and the water-insolubles separated from the aqueous phase containing beta acids. To the aqueous phase was added an additional 10 ml of hexane and 5 ml of 10% $MgCl_2$ solution, whereafter it was agitated at a pH of 12.8 overnight. The aqueous phase was separated from the insolubles, filtered, and recovered into hexane at a pH of about 9.9 by adding phosphoric acid. The hexane was removed under vacuum to give 6.6 g of beta acids of 100% purity by spectral analysis. This product hydrogenated to completion under standard conditions within two hours.

The water insolubles, separated from the water-soluble beta acids, were agitated with hexane and acidified to take them into hexane. The hexane was evaporated and 2.28 g of residue recovered. When this 2.28 g of catalyst poisons was added to 72 g of beta acids which had been previously purified exactly as above, giving a ratio of poisons about one-half that present in the original hop extract, only about 10% of the required hydrogen was taken up within two hours under standard conditions, and the hydrogenolysis took up 90% of the theoretical hydrogen in 16 hours. The same Mg unpurified beta acids took up no hydrogen in 16 hours.

This shows that the catalyst poisons were removed from the beta acids by the treatment of the invention and remain in the water-insoluble phase in the presence of Mg ion, but not in its absence.

This example demonstrates both the removal and separation of catalyst poison, and the fact that, when reintroduced into purified beta, they effectively prevent hydrogenolysis under mild conditions which are satisfactory for commercial operation.

The same advantageous results are obtained in the hydrogenolysis step whether the catalyst employed is palladium on charcoal or platinum.

EXAMPLE 4

Purification of beta acids with magnesium ion in the presence of hexane 11.5 g of crude beta acids in 70 ml hexane were extracted three times with water at a pH between 9 and 10 to remove traces of alpha acids, isoalpha acids, etc., the hexane containing the beta acids was then extracted into 100 ml of water at pH 12.2, and the hexane discarded. The aqueous alkaline beta acids were extracted with hexane an additional three times, to remove traces of lipids, etc. To the cleansed alkaline beta acid solution was added 20 ml of fresh hexane and 0.88 g $MgCl_2.6H_2O$ in 10 ml water. The solution was then agitated for eight hours under nitrogen atmosphere, the aqueous layer filtered, and the purified beta acids extracted back into hexane by lowering the pH to 9.2. The recovered beta acids hydrogenolyzed in four hours.

This example shows that acceptable purification is achieved with one magnesium treatment when substances more acidic then beta acids are first removed, and all traces of lipids, etc., also removed. This is a preferred embodiment of the invention. Other hydrocarbon solvents can be substituted for hexane.

EXAMPLE 5

Use of calcium ion

Although magnesium ions are used as preferred ions in these examples, calcium ions are equally effective. Their principle disadvantage appears to be their somewhat lower solubility in the higher pH ranges which are used normally in the beta purification process of the invention.

140 ml of a solution of about 5% beta acids in water, at a pH of 12, from which the non-acidic resins had been removed, was agitated at a pH of 12.2 with 2.3 ml of 10% $MgCl_2.6H_2O$ for 13 hours in the presence of 15 ml hexane. The aqueous phase was separated and filtered, the beta acids recovered into hexane at a pH of 9.8, and this solution then desolventized and hydrogenolyzed.

Exactly the same procedure was followed, except that 1.3 ml of 68% w/v of $CaCl_2$ in 20 ml of water was added in place of the magnesium salt, and hexane was present along with the $CaCl_2$.

The beta purified with Mg took up its required hydrogen in 2 hours, and that purified with calcium ion in about 1¾ hours.

These metals can also be added as their oxides or hydroxides, in which case very fine powders are recommended. If not in the form of fine powders, they are not as effective on a weight for weight basis, and in addition are dusty and unpleasant to work with. The chlorides, or even sulfates, are accordingly preferred in practice.

Because of the greater solubility of the polyvalent metal ions at a lower pH, this invention contemplates using any alkaline pH of at least about 10. However, the optimum pH because of the limited solubility of beta acids in water at a lower pH is about 10.5 to 12, and optimally about 11 to 12, with an even higher pH being workable but not preferable. One skilled in the art can make the appropriate economic trade-offs, with regard to the exact pH to be employed to achieve the desired purification of the beta acids, without difficulty.

EXAMPLE 6

Use of a polyvalent metal ion other than Ca or Mg

Although calcium and magnesium ions are the preferred purification agents, since they are edible and also normally found in water and beer, other non-toxic polyvalent metals may be used, such as zinc, aluminum, or iron. Because iron is pro-oxidant in many systems, and because aluminum is more difficult to remove than zinc, zinc is the preferred member of this secondary class. All three of these metals are normally present during the brewing process in trace amounts.

A 10% solution of beta acids in water was washed twice with hexane to remove non-acidic resins. To 130 ml of this pH 12.2 solution, 3 ml of 20% $ZnCl_2$ was added, as well as 15 ml hexane, and the mixture agitated three hours. An additional 3 ml of zinc chloride solution was added, and agitation continued for 5 hours. The aqueous phase was separated and filtered, and the beta acids recovered into hexane. Hydrogen uptake was complete within 2½ hours.

A comparative example, using magnesium chloride, and the same starting beta acid solution, completed hydrogen uptake in 2 hours.

Both examples show that multi-dosing of the metal ion may be beneficial.

EXAMPLE 7

Use of a solvent extract of hops

Although it is well known that carbon dioxide extracts of hops contain fewer undefined resins than solvent extracts and that, of the solvent extracts, hexane extracts contain fewer undefined substances than methylene chloride or alcohol extracts, any food grade solvent extract of hops may be used in accordance with the present invention.

Of the solvent extracts, a hexane extract is preferred, since it contains a minimal amount of polyphenols and other undefined substances derived from hops, which should be removed by water washing of the extract prior to separation of the beta acids therefrom.

In this Example, a hexane extract of hops is agitated with sufficient water to give about a 15% solution of alpha acids at a pH of 9.5, and the alpha acids removed. The hexane phase is again extracted at a pH of 9.5 to remove residual alpha acids, and the beta acids in turn extracted as a solution of 7-20% concentration in water at a pH of 12-13. This solution, if again washed once or twice with hexane to remove residual non-acidic resins, may be dosed with Ca or Mg ion as in Example 4 or 5, and the purified beta recovered from the filtered aqueous solution. Hydrogenolysis times in this case are slightly longer than with the beta acid product from the corresponding procedure starting from a carbon dioxide extract.

It is mentioned above that methylene chloride has been used to extract hops. However, all chlorinated solvents are now under a regulatory cloud, and some, such as trichloroethylene, are considered passé. From a brewer's standpoint, chlorinated solvents are generally considered undesirable, even though operative. The present purification process is obviously effective without depending upon the use of such solvents.

EXAMPLE 8

Use of magnesium hydroxide and calcium hydroxide

It is well known that magnesium hydroxide is virtually insoluble in water at a pH above about 10, and its sparing solubility somewhat reduces its effectiveness as a purifying agent at such pH levels. However, it may nevertheless be used within the concept of the present invention as this Example will show.

Beta acids, as prepared in Example 4, were made into a 7% solution in water at a pH of 12.4, whereafter 4% (by weight of the beta acids) of $Mg(OH)_2$ powder was added thereto over a period of 6 hours. The mixture was agitated for 6 additional hours in the absence of solvent, and the alkaline solution then separated and filtered to remove solids. The alkaline solution was again filtered, whereafter the beta was recovered by acidification into hexane and hydrogenolyzed under the standard conditions in 8 hours using either Pd/Ch or platinum as catalyst.

Calcium hydroxide behaves in the same manner.

EXAMPLE 9

Comparative purity of 4-desoxy alpha acids made from purified and unpurified beta acids The previous Examples, many of which used starting carbon dioxide hop extracts, showed that without purification the beta acids would not hydrogenate under standard conditions, even with three times the standard amount of catalyst. This example uses a hop extract which, for unknown reasons, is low in catalyst poisons and the unpurified beta acids to hydrogenolyze with a triple dose of catalyst. It demonstrates, however, that the purity of the 4-desoxy alpha acid product made from the unpurified beta acids is lower, giving a lower yield with increased costly dosages of catalyst, as compared to the purified beta acids produces according to the present invention.

A hexane extract of hops, in solution in hexane at a concentration of about 15%, was extracted three times with water at a pH of 9.4 to 9.8 (as high as about 10.2 will work without losing significant amounts of beta). The aqueous phases were used to make iso-alpha acids from the alpha acids therein. The hexane phase, containing beta acids and hop resins, was extracted into water at a pH of 12.4 to give a 15% solution of beta in water. The hexane containing non-acidic resins was discarded, and the water extracted an additional two times with hexane. The water, containing the beta, was mixed with one volume of hexane, and the beta acids recovered into it at a pH of 9.9. The water was discarded and the hexane washed once more with water. The hexane, containing about 16% beta acids, was divided into three portions, called A, B, and C.

Portion A was desolventized to give beta acids. These in turn were dissolved in 120 ml of water at pH 12.7 and dosed with 1.7 ml of 20% $MgCl_2$ in 10 ml water, agitated three hours, and filtered. The filtrate was redosed, agitated an additional three hours, filtered, and recovered into hexane at pH 9.8. The hexane was removed from the purified beta acid product, which took up its hydrogen in 4½ hours using a 2½ Pd/Ch catalyst.

Portion B was depoisoned in exactly the same way, but in the presence of hexane. The purified beta took up its hydrogen in two hours, showing again that the use of hexane for recovery of beta is a preferred embodiment of this invention.

Portion C was desolventized to give unpurified beta, which did not hydrogenolyze rapidly with a single dose of catalyst. The catalyst dose was tripled, whereupon the unpurified beta took up its required hydrogen in four hours, but the product was less pure as shown below. This demonstrates that the purity of the 4-desoxy alpha acids is impaired by the catalyst poisons, even when a large excess of catalyst is used, and that catalyst poison removal is therefore also beneficial and significant in terms of yield of pure 4-desoxy alpha acid product.

The ratio of the absorbances of the 4-desoxy alpha acid product, in alkaline methanol at 320:350 nm, is a measure of purity. The higher ratios indicate higher purity. The ratios were as follows:

A=0.828; B=0.833; C=0.810.

Clearly C is least pure.

EXAMPLE 10

A Preferred Procedure

A preferred method of removing the poisons, utilizing only liquids commonly found as natural constituents of foods, is described in this Example.

An orange oil, consisting essentially of limonene, which is a terpene, and a C-10/C-14 fatty alcohol obtained from palm oil, are mixed in a ratio of 2.5:1.

Crude beta acids, from which alpha acids and nonacidic resins have been substantially removed, are dissolved in water at a pH of about 11.5, and at a concentration of about 7.5%. Two percent (2%) by volume of the orange-alcohol mixture is added, followed by 2.5% by volume of 5% $MgCl_2$. The mixture is agitated for three hours, the oil separated, and the procedure repeated twice, one of the agitation periods being conveniently overnight. After removal of the organic phase, the beta acids are recovered into hexane by dropping the pH to about 9.5 (alternatively, precipitated with $CO_2$), desolventized, and hydrogenated. Hydrogen uptake ceases after three hours, demonstrating that poisons have been removed.

It should be noted that limonene is one of a class of terpenes, of which myrcene, a major constituent of hop oil, is a member. Any natural terpene can be substituted in this Example.

The pH range for this Example is preferably about 11.2–11.9, although higher pH's are also operative. Calcium, while less preferable, may be substituted for Mg.

In conclusion, from the foregoing, it is apparent that the present invention provides a novel method for the purification of hop beta acids to remove unidentified catalyst poisons therefrom which involves the elimination of such impurities from an aqueous alkaline solution thereof by precipitation with polyvalent metal ions, preferably edible polyvalent metal ions such as calcium or magnesium ions, and recovery of the purified beta acids either from a solvent-free medium or by recovery into a suitable organic solvent, and if desired also involving the subsequent and improved step of hydrogenolyzing the thus-purified beta acids to 4-desoxy alpha acids, as well as the novel purified and stable beta acids thus produced, all having the foregoing enumerated characteristics and advantages.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope of the appended claims.

We claim:

1. A method for the removal of palladium or platinum catalyst poisons from a beta acid solution containing the same, consisting essentially of the step of agitating an aqueous alkaline solution of beta acids at a pH of at least about 10 in the presence of a metal oxide, hydroxide, or salt which provides polyvalent metal ions other than palladium and platinum, and separating insoluble materials containing catalyst poisons from the aqueous beta acid solution.

2. The method of claim 1 wherein the polyvalent metal ions are selected from the group consisting of calcium and magnesium ions.

3. The method of claim 1 which is conducted in the essential absence of organic solvent.

4. The method of claim 1, in which the method is carried out in the presence of a food-grade organic solvent of natural or synthetic origin.

5. The method of claim 4, in which the solvent is a non-chlorinated solvent.

6. The method of claim 4, in which the solvent is a hydrocarbon solvent.

7. The method of claim 1, wherein the procedure is repeated more than once with removal of insoluble material each time.

8. The method of claim 1, wherein the procedure is carried out at a pH above about 10.5 and below about 12.9.

9. The method of claim 1, wherein the procedure is carried out at a pH above about 11 and below about 12.9.

10. The method of claim 1, wherein the metal ions are provided in the form of magnesium chloride $MgCl_2$.

11. The method of claim 1, wherein the metal ions are provided in the form of calcium chloride $CaCl_2$.

12. The method of claim 1, wherein the metal ions are provided in the form of magnesium hydroxide $Mg(OH)_2$.

13. The method of claim 1, wherein the metal ions are provided in the form of calcium hydroxide $Ca(OH)_2$.

14. The method of claim 1, in which the purified beta acids are recovered by precipitation from a solvent-free purified aqueous beta acid solution by reducing the pH using carbon dioxide or an edible mineral or organic acid.

15. The method of claim 1, in which the purified beta acids are recovered from the aqueous solution into a food-grade solvent by reducing the pH in the presence of a food-grade solvent.

16. The method of claim 1, in which the purified beta acids are recovered from the aqueous solution by salting out.

17. The method of claim 1, in which the metal ions are edible polyvalent metal ions.

18. A method for the removal of palladium or platinum catalyst poisons from a beta acid solution comprising the step of agitating an aqueous alkaline solution of beta acids at a pH above about 10.5 in the presence of calcium or magnesium ions and in the essential absence of organic solvent, and separating insoluble materials containing catalyst poisons from the aqueous beta acid solution, wherein the procedure may be repeated more than once with removal of insoluble material each time, and then recovering the purified beta acids from the aqueous solution by reducing the pH using carbon dioxide or an edible mineral or organic acid.

19. A method for the removal of palladium or platinum catalyst poisons from a beta acid solution comprising the step of agitating an aqueous alkaline solution of beta acids at a pH between about 11.2 and 11.9 in the presence of calcium or magnesium ions and in the presence of a natural oil comprising a terpene and a fatty alcohol, and separating insoluble materials containing catalyst poisons from the aqueous beta acid solution, wherein the procedure may be repeated more than once with removal of insoluble material each time, and then recovering the purified beta acids from the aqueous solution by reducing the pH using carbon dioxide or an edible mineral or organic acid.

20. The method of claim 1, wherein the thus-purified beta acids are subjected to hydrogenolysis to produce 4-desoxy alpha acids.

21. The method of claim 2, wherein the thus-purified beta acids are subjected to hydrogenolysis to produce 4-desoxy alpha acids.

22. The method of claim 4, wherein the thus-purified beta acids are subjected to hydrogenolysis to produce 4-desoxy alpha acids.

23. The method of claim 8, wherein the thus-purified beta acids are subjected to hydrogenolysis to produce 4-desoxy alpha acids.

24. The method of claim 14, wherein the thus-purified beta acids are subjected to hydrogenolysis to produce 4-desoxy alpha acids.

25. The method of claim 15, wherein the thus-purified beta acids are subjected to hydrogenolysis to produce 4-desoxy alpha acids.

26. The method of claim 16, wherein the thus-purified beta acids are subjected to hydrogenolysis to produce 4-desoxy alpha acids.

27. The method of claim 17, wherein the thus-purified beta acids are subjected to hydrogenolysis to produce 4-desoxy alpha acids.

28. The method of claim 18, wherein the thus-purified beta acids are subjected to hydrogenolysis to produce 4-desoxy alpha acids.

29. The method of claim 19, wherein the thus-purified beta acids are subjected to hydrogenolysis to produce 4-desoxy alpha acids.

30. The method of claim 20, wherein the hydrogenolysis is conducted in the presence of a catalyst selected from palladium and platinum catalysts.

31. The method of claim 20, wherein the hydrogenolysis is conducted in the presence of a palladium on charcoal catalyst.

32. The method of claim 28, wherein the hydrogenolysis is conducted in the presence of a palladium on charcoal catalyst.

33. The method of claim 29, wherein the hydrogenolysis is conducted in the presence of a palladium on charcoal catalyst.

34. Purified beta acids which are free of palladium and platinum catalyst poisons which have been removed by agitating an aqueous alkaline solution of beta acids containing the same with a metal oxide, hydroxide, or salt which provides polyvalent metal ions other than palladium and platinum and separating insoluble materials containing catalyst poisons.

35. Beta acids of claim 34, wherein the polyvalent metal ions are selected from the group consisting of calcium and magnesium ions.

36. The method of claim 1, when carried out in the presence of non-acidic resins of the hop extract.

37. The method of claim 2, when carried out in the presence of non-acidic resins of the hop extract.

* * * * *

UNITED STATES PATENT AND TRADEMARK OFFICE
CERTIFICATE OF CORRECTION

PATENT NO. : 4,918,240

DATED : April 17, 1990

INVENTOR(S) : Paul H. Todd, Jr.; James A. Guzinski

It is certified that error appears in the above-identified patent and that said Letters Patent is hereby corrected as shown below:

Title Page, References Cited, U. S. Patent Documents, 4th listing; "4,160,287" should read -- 4,160,787 --.

Column 1, line 29; "poisons" should read -- poisons, --.

Column 10, line 1; "then" should read -- than --.

Column 12, line 17; "produces" should read -- produced --.

Column 13, line 40; "acids" should read -- acids, --.

Title Page, References Cited, U. S. Patent Documents, 1st listing; "Warden" should read -- Worden --.

Title Page, References Cited, U. S. Patent Documents, 3rd listing; "4,154,864" should read -- 4,154,865 --.

Title Page, References Cited, U. S. Patent Documents, last listing; "Todd et aL" should read -- Todd, Jr. et al. --.

Signed and Sealed this

Thirteenth Day of August, 1991

Attest:

HARRY F. MANBECK, JR.

*Attesting Officer*

*Commissioner of Patents and Trademarks*